March 10, 1931.    J. L. WOODBRIDGE    1,795,462
SYSTEM OF ELECTRICAL DISTRIBUTION
Filed March 1, 1926

WITNESS:

INVENTOR
Joseph Lester Woodbridge
BY
Augustus B. Stoughton
ATTORNEY.

Patented Mar. 10, 1931

1,795,462

UNITED STATES PATENT OFFICE

JOSEPH LESTER WOODBRIDGE, OF PHILADELPHIA, PENNSYLVANIA

SYSTEM OF ELECTRICAL DISTRIBUTION

Application filed March 1, 1926. Serial No. 91,362.

This invention relates to systems in which a storage battery is arranged to be charged from a suitable source of current and to be discharged into a load circuit to which translating devices are connected, and is especially applicable to cases where the load on the load circuit is variable or intermittent in character making it desirable to vary the amount of charge put into the battery from time to time to restore what has been taken out. One of the objects of my invention is to make the charging of the storage battery entirely automatic and at the same time to provide for the necessary amount of overcharge to compensate for the losses in the battery. My invention is especially effective in providing for a more accurate adjustment of the charging current than has heretofore been possible with known automatic means of this general kind and accomplishes this with comparatively simple, reliable and inexpensive apparatus.

Figure 1:
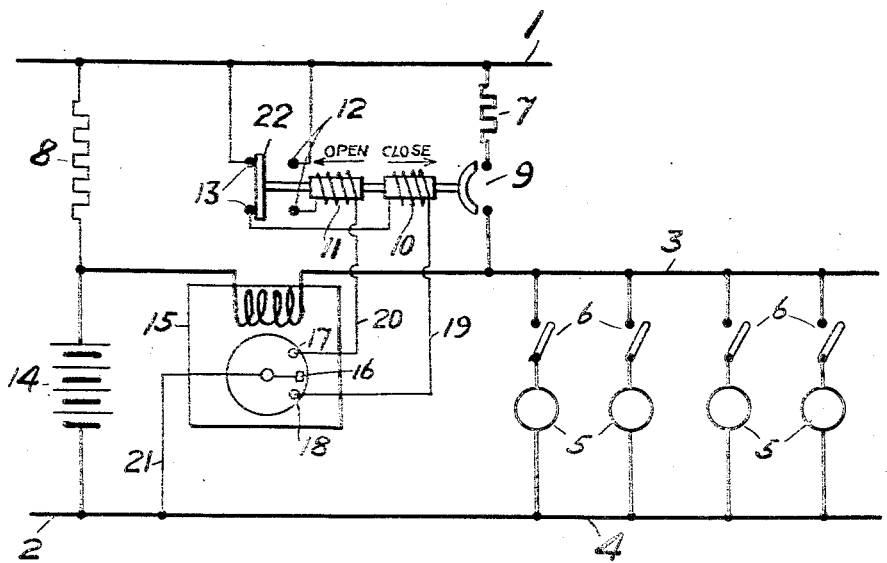
Figure 2:
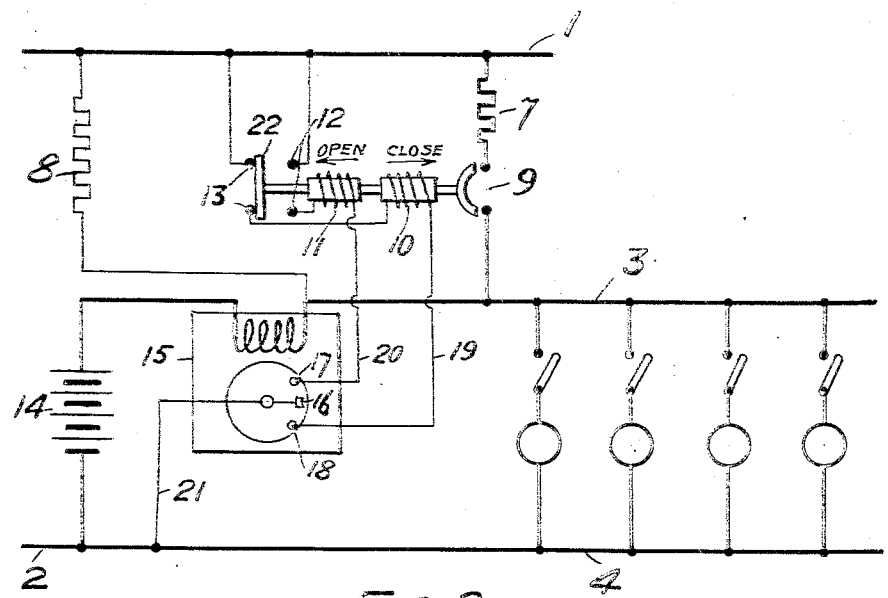

My invention will be more readily understood by reference to the following description of one embodiment thereof, taken in connection with the accompanying drawings in which Figure 1 represents diagrammatically a system of electrical distribution embodying the invention; and Figure 2 similarly shows a modification.

In Figure 1, 14 is a storage battery connected to the load circuit 3, 4, to which are connected the translating devices 5 through suitable switches 6. 1, 2 represents the circuit of any suitable charging source for the storage battery, the conductor 2 being directly connected to one terminal of the battery, while the conductor 1 is connected to the opposite terminal of the battery through a resistor 8 and also through another resistor 7. Included in the circuit of the latter resistor is a circuit breaker 9 arranged to automatically connect and disconnect the resistor 7 as will be hereinafter described. Between the battery 14 and the conductor 3 of the load circuit is an ampere hour meter 15 provided with a moving arm 16, which travels in the direction of the arrow when the battery is discharging and in the opposite direction when the battery is charging. On this ampere hour meter are provided two stationary contacts 17 and 18 located in the path of the arm 16 in such positions that when the ampere hour meter indicates that the battery is fully charged the arm 16 will be in contact with the contact point 17 and when the battery is discharged by a certain predetermined amount, the arm 16 will have travelled until it is in contact with the contact point 18. The arm 16 is connected to the conductor 2 by means of conductor 21. Contact 17 is connected by conductor 20 to one terminal of the tripping coil 11 of the circuit breaker 9, the other terminal of this coil being connected through the auxiliary contacts 12 to conductor 1. Contact 18 of the ampere hour meter is connected by conductor 19 to one terminal of the closing coil 10 of the circuit breaker 9, the other terminal of this coil being connected through auxiliary contacts 13 to conductor 1. Thus when the arm 16 of the ampere hour meter makes contact with contact point 17, the circuit through the tripping coil 11 of the circuit breaker will be completed, provided the auxiliary contacts 12 are bridged by the contact piece 22, which will be the case when the circuit breaker 9 is closed. This will trip the circuit breaker and open the circuit of the charging resistance 7. At the same time the contact piece 22 will be moved by the opening of the circuit breaker out of contact with the auxiliary contact points 12 and into contact with the auxiliary contact points 13, thus connecting the closing coil 10 of the circuit breaker to conductor 1. If now the battery discharges into the load circuit causing the arm 16 of the ampere hour meter to travel in the direction of the arrow until it makes contact with contact point 18, the closing coil 10 will be energized and the circuit breaker 9 will close thus reconnecting charging resistance 7.

It will be noted that current from the battery to the load circuit passes through the ampere hour meter in the discharge direction, while current from conductor 1 through resistor 7 passes to the battery through the ampere hour meter in the charge direction, whereas current from conductor 1 through resistor 8 passes directly to the battery without passing through the ampere hour meter. When there is no demand on the load circuit, this current passes through the battery in the charge direction without affecting the ampere hour meter. When there is a demand on the load circuit, this current through resistor 8 supplies a part of the demand, thus reducing the battery discharge but the current in the ampere hour meter is still unaffected by this current through the resistor 8, the net result in respect to the total amount of overcharge given to the battery being the same. The ampere hour meter should be designed to run more slowly in the charge direction than in the discharge direction, thus providing for a certain percentage of overcharge to compensate for the ampere hour efficiency of the battery. The ampere hour meter described above, as well as the circuit breaker, are well known pieces of apparatus, and can readily be obtained on the market, so that it is not necessary to enter into a more detailed description of these devices.

The combination of the battery and ampere hour meter and circuit breaker and resistor 7 and their circuit connections is well known in the art, and has been extensively used for the automatic control of storage battery charging. It provides for giving the battery a certain percentage of overcharge, that is, the number of ampere hours put into the battery during the charge is a certain percentage in excess of the number of ampere hours taken out during the previous discharge. Where the battery is operated under conditions calling for daily discharges amounting to a very considerable proportion of its capacity, this method of operation is quite satisfactory, since the principal losses to be provided for by battery overcharge are those due to the inefficiency of the charging current, some of which is necessarily wasted in gassing toward the end of charge and the amount of this loss is roughly proportionate to the amount of charge. If, however, the battery is subjected to only occasional discharges of small amount or at comparatively long intervals of time, the standing losses in the battery, due to local action, may become a very considerable proportion of the total losses or may constitute the principal amount of the losses to be compensated for. These standing losses bear no proportion to the amount of discharge, but are approximately proportional to the total elapsed time and they cannot, therefore, be accurately provided for by the adjustment of the ampere hour meter to run a certain percentage slower on charge than on discharge. To provide for these standing losses I have shown the resistor 8 connected between conductor 1 and the corresponding terminal of the battery, the point of connection to the battery circuit being located between the battery and the ampere hour meter, so that the charging current passing through resistor 8 does not pass through the ampere hour meter. It will further be noted that the current passing through resistor 8 is flowing continuously and is not interrupted by the circuit breaker 9.

In Figure 2 a modification is shown in which the charging current through resistor 8 passes through the ampere hour meter as well as the current through resistor 7. However, the circuit of resistor 8 is not interrupted by the circuit breaker 9, and therefore transmits charging current continuously suitable for compensating for the internal losses in the battery. The effect of this current on the ampere hour meter will usually be negligible since this instrument is usually designed so that when the hand reaches the stop 17, indicating a fully charged condition of the battery, it will not travel further in the charge direction even though the charging current continues to flow.

It will be noted from the above that I am providing two paths for charging current into the storage battery, one of which is continuously closed and transmits current suitable for compensating for the standing losses in the battery, and the other is opened and closed automatically by a device responsive to the current in the external battery circuit.

It will be obvious to those skilled in the art that modifications may be made in details of construction and arrangement without departing from the spirit of the invention which is not limited as to such matters or otherwise than as the prior art and the appended claims may require.

I claim:

1. In combination a storage battery and its load circuit, an ampere hour meter connected between the battery and the load circuit and having a traveling arm and spaced contacts in the path of the travel of the arm, a charging source, a charging circuit adapted to transmit current from the source to the battery through the ampere hour meter, said circuit including a circuit breaker having opening and closing coils connected respectively to said spaced contacts to open the circuit breaker at full charge and to close it when the battery is discharged to a predetermined amount, and a second charging circuit adapted to transmit current from the source to the battery.

2. In combination, a storage battery, a charging source, a circuit for transmitting continuously from the source to the battery a charging current adapted to compensate for the internal losses of the battery, another circuit for transmitting charging current to the battery, means responsive to the state of charge of the battery for opening and closing the last named circuit without affecting the first, and a load circuit connected to the battery.

3. In combination, a storage battery, a charging source, a load circuit connected to the battery, a circuit for transmitting continuously from the source to the battery a charging current adapted to compensate for the internal losses of the battery, a second charging circuit for transmitting to the battery a charging current adapted to compensate for the losses due to the load on the battery, and means responsive to the state of charge of the battery for opening and closing the second charging circuit without affecting either of the other circuits.

4. In combination, a storage battery, a charging source; a circuit for transmitting continuously from the source to the battery a charging current adapted to compensate for the internal losses of the battery; a second charging circuit for transmitting to the battery a charging current adapted to compensate for the losses due to the load on the battery; said second charging circuit containing a circuit breaker and an ampere hour meter; means controlled by said ampere hour meter for opening and closing said circuit breaker; and a load circuit connected to the battery between the battery and the circuit breaker.

5. In combination a storage battery and its load circuit, an ampere hour meter connected between the battery and the load circuit and having a traveling arm and spaced contacts in the path of the travel of the arm, a charging source, a charging circuit adapted to transmit current from the source to the battery through the ampere hour meter, said circuit including a circuit breaker having opening and closing coils connected respectively to said spaced contacts to open the circuit breaker at full charge and to close it when the battery is discharged to a predetermined amount and a second charging circuit permanently connecting said battery with said charging source.

JOSEPH LESTER WOODBRIDGE.